(12) United States Patent
Shen et al.

(10) Patent No.: US 11,847,091 B2
(45) Date of Patent: Dec. 19, 2023

(54) DATA TRANSMISSION METHOD AND DEVICE FOR NETWORK ON CHIP AND ELECTRONIC APPARATUS

(71) Applicant: LYNXI TECHNOLOGIES CO., LTD., Beijing (CN)

(72) Inventors: Yangshu Shen, Beijing (CN); Luping Shi, Beijing (CN); Yaolong Zhu, Beijing (CN)

(73) Assignee: LYNXI TECHNOLOGIES CO., LTD., Beijing (CN)

( * ) Notice: Subject to any disclaimer, the term of this patent is extended or adjusted under 35 U.S.C. 154(b) by 102 days.

(21) Appl. No.: 17/418,348

(22) PCT Filed: Nov. 28, 2019

(86) PCT No.: PCT/CN2019/121524
§ 371 (c)(1),
(2) Date: Jun. 25, 2021

(87) PCT Pub. No.: WO2020/134831
PCT Pub. Date: Jul. 2, 2020

(65) Prior Publication Data
US 2022/0083498 A1 Mar. 17, 2022

(30) Foreign Application Priority Data
Dec. 28, 2018 (CN) .......................... 201811619018.4

(51) Int. Cl.
*G06F 15/78* (2006.01)
(52) U.S. Cl.
CPC ................................ *G06F 15/7825* (2013.01)
(58) Field of Classification Search
CPC .................................................. G06F 15/7825
See application file for complete search history.

(56) References Cited

U.S. PATENT DOCUMENTS 8,306,042 B1 * 11/2012 Abts ...................... H04L 45/58
370/401
2009/0106569 A1 4/2009 Roh et al.
(Continued)

FOREIGN PATENT DOCUMENTS

CN 101141261 A 3/2008
CN 101409680 A 4/2009
(Continued)

OTHER PUBLICATIONS

Dechun Kong, et al., "Research and Design of 2D-Mesh Network-on-chip based on Multi-core System", Microelectronic & Computer, dated Apr. 2015, vol. 32 No. 4.

*Primary Examiner* — Jacob Petranek
(74) *Attorney, Agent, or Firm* — Li & Cai Intellectual Property (USA) Office

(57) ABSTRACT

The present disclosure provides a data transmission method and device for a network on chip and an electronic apparatus. The method includes: receiving, by a second network node, a first data packet sent by a first network node, the first data packet including first identification information and a data packet payload; determining, by the second network node, valid transmission information and second identification information corresponding to the valid transmission information according to the first identification information; determining, by the second network node, a second data packet according to the second identification information and the data packet payload; and sending, by the second network node, the second data packet according to the valid transmission information.

12 Claims, 5 Drawing Sheets

(56) References Cited

U.S. PATENT DOCUMENTS

| | | | |
|---|---|---|---|
| 2014/0254425 A1 | 9/2014 | Riedl et al. | |
| 2015/0188847 A1 | 7/2015 | Chopra et al. | |
| 2017/0063610 A1* | 3/2017 | Kumar | H04L 45/04 |
| 2017/0171111 A1* | 6/2017 | Khare | H04L 49/109 |
| 2017/0185449 A1* | 6/2017 | Zhang | G06F 9/5027 |
| 2018/0227146 A1 | 8/2018 | Zheng et al. | |
| 2020/0026684 A1* | 1/2020 | Swarbrick | H04L 49/254 |
| 2020/0153757 A1* | 5/2020 | Bharadwaj | H04L 49/109 |

FOREIGN PATENT DOCUMENTS

| | | |
|---|---|---|
| CN | 103986664 A | 8/2014 |
| CN | 104901899 A | 9/2015 |
| CN | 105450555 A | 3/2016 |
| CN | 106804048 A | 6/2017 |

\* cited by examiner

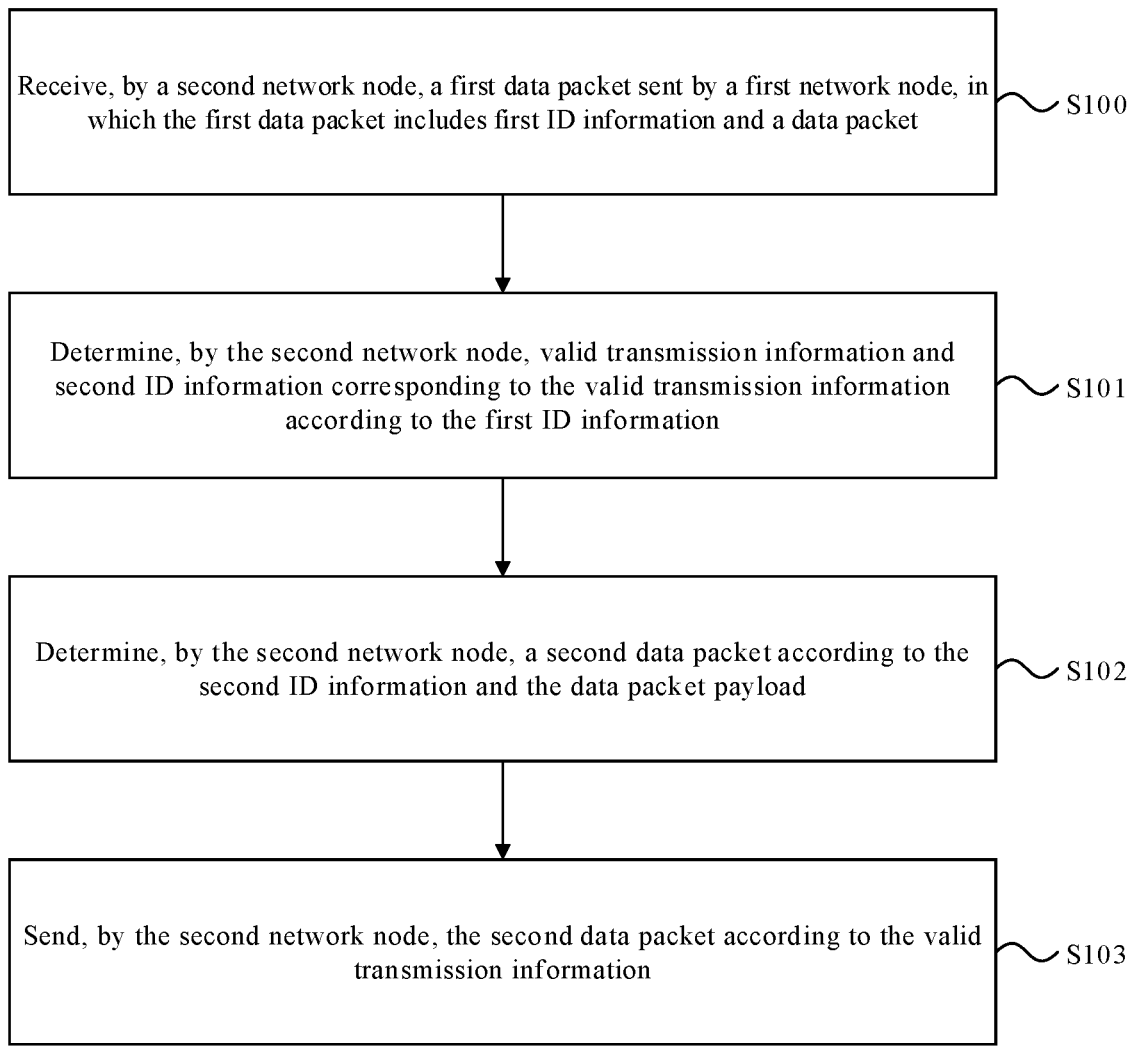

DATA TRANSMISSION METHOD AND DEVICE FOR NETWORK ON CHIP AND ELECTRONIC APPARATUS

CROSS-REFERENCE TO RELATED APPLICATIONS

The present application is a National Phase Application filed under 35 U.S.C. 371 as a national stage of PCT/CN2019/121524, filed on Nov. 28, 2019, an application claiming priority from Chinese Patent Application No. 201811619018.4, filed on Dec. 28, 2018 in the Chinese Intellectual Property Office and titled "DATA TRANSMISSION METHOD AND DEVICE FOR NETWORK ON CHIP AND ELECTRONIC APPARATUS", the content of which is hereby incorporated herein by reference in its entirety.

TECHNICAL FIELD

The present disclosure relates to the field of communication technology, and more particularly, to a data transmission method and device for a network on chip and an electronic apparatus.

BACKGROUND

With the development of artificial intelligence technology, users' requirement to chip processing capability is increased. Due to a limited processing capability of a single-core chip, many-core chips are used more and more widely. In many-core chip design, a Network on Chip (NOC) is used to implement communication between cores. Therefore, a performance of the NOC is a key performance of a many-core chip.

In the related art, the NOC is used for communication between cores by the many-core chip. For example, a specific method for sending a data packet to a slave data receiving unit (Slave, S) by a master data sending unit (Master, M) includes: first, M adds an address of a destination core to a header of the data packet, M then sends the data packet to an intermediate network node (Node, n) connected thereto, and n sends the data packet to S directly or through other intermediate network node(s). With the above method, the address of the destination core needs to be added to the header, which increases a payload. Furthermore, when the data packet needs to be multicast to a plurality of S, addresses of a plurality of destination cores need to be added to the header, which increases the payload. When data transmission is performed, all cores need to be addressed uniformly, each core needs to save a complete routing table, and thus, an overhead is huge.

SUMMARY

In view of this, the present disclosure provides a data transmission method and device for a network on chip and an electronic apparatus, to solve a problem that the overhead is huge when the NOC is used for communication between the cores by the many-core chip in the related art.

According to a first aspect of embodiments of the present disclosure, provided is a data transmission method for an network on chip, including: receiving, by a second network node, a first data packet sent by a first network node, the first data packet including first identification information and a data packet payload; determining, by the second network node, valid transmission information and second identification information corresponding to the valid transmission information according to the first identification information; determining, by the second network node, a second data packet according to the second identification information and the data packet payload; and sending, by the second network node, the second data packet according to the valid transmission information.

In an embodiment, a quantity of the valid transmission information is one or more, and the second identification information has a one-to-one correspondence with the valid transmission information.

In an embodiment, the step of determining, by the second network node, the valid transmission information and the second identification information corresponding to the valid transmission information according to the first identification information may include: inquiring, by the second network node, in a preset path routing table according to the first identification information, to determine the valid transmission information and the second identification information corresponding to the valid transmission information, the path routing table being set according to the first identification information and including the first identification information, the valid transmission information and the second identification information.

In an embodiment, the step of determining, by the second network node, the second data packet according to the second identification information and the data packet payload may include: replacing, by the second network node, the first identification information in the first data packet with the second identification information, to obtain the second data packet.

In an embodiment, after the step of receiving, by the second network node, the first data packet sent by the first network node, the method may further include: determining, by the second network node, a storage address of the first data packet according to the first identification information, in response to that there is no valid transmission information; and storing, by the second network node, the first data packet to the storage address.

In an embodiment, the path routing table is stored in a register of the second network node or stored in a random access memory.

According to a second aspect of the embodiments of the present disclosure, provided is a data transmission device for an on-chip network, including: a receiving unit configured to receive a first data packet sent by a first network node, the first data packet including first identification information and a data packet payload; a first determining unit configured to determine valid transmission information and second identification information corresponding to the valid transmission information according to the first identification information; a second determining unit configured to determine a second data packet according to the second identification information and the data packet payload; and a sending unit configured to send the second data packet according to the valid transmission information.

In an embodiment, a quantity of the valid transmission information is one or more, and the second identification information has a one-to-one correspondence with the valid transmission information.

In an embodiment, the first determining unit is configured to inquire in a preset path routing table according to the first identification information, to determine the valid transmission information and the second identification information corresponding to the valid transmission information, the path routing table being set according to the first identification information and including the first identification information, the valid transmission information and the second identification information.

In an embodiment, the second determining unit is configured to replace the first identification information in the first data packet with the second identification information, to obtain the second data packet.

In an embodiment, the device may further include a storage unit configured to: determine a storage address of the first data packet according to the first identification information, in response to that there is no valid transmission information; and store the first data packet to the storage address.

In an embodiment, the path routing table is stored in a register of a second network node to which the receiving unit belongs, or stored in a random access memory.

According to a third aspect of embodiments of the present disclosure, provided is an electronic apparatus, including: a plurality of processing cores; and a network on a chip configured to exchange data between the plurality of processing cores and external data, an instruction being stored in the plurality of processing cores, and the electronic apparatus executing the method according to the first aspect or any one of possible methods in the first aspect according to the instruction.

According to a fourth aspect of embodiments of the present disclosure, provided is a computer-readable storage medium storing a computer program instruction thereon, which is executed by a processor to implement the method according to the first aspect or any one of possible methods in the first aspect.

According to a fifth aspect of embodiments of the present disclosure, provided is a computer program product, which, when run on a computer, causes the computer to implement the method according to the first aspect or any one of possible methods in the first aspect.

BRIEF DESCRIPTION OF THE FIGURES

The above and other objectives, features and advantages of the present disclosure will be apparent from the following description of embodiments of the present disclosure with reference to the accompanying drawings, in which:

FIG. 1 is a flowchart of a data transmission method for a network on chip according to an embodiment of the present disclosure;

FIG. 2 is a schematic diagram of data transmission for a network on chip according to an embodiment of the present disclosure;

DETAILED DESCRIPTION

Figure 3:
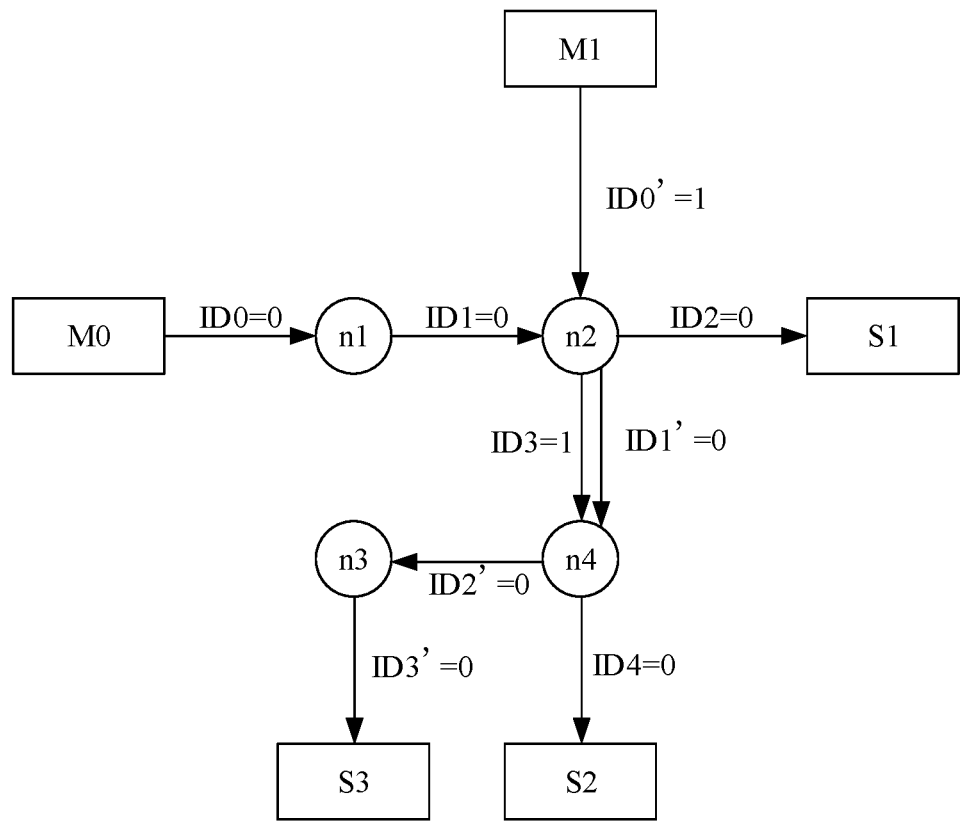
FIG. 3 is another schematic diagram of data transmission for a network on chip according to an embodiment of the present disclosure.

The present disclosure will be described below based on embodiments, but is not limited to these embodiments. In the following detailed description of the present disclosure, some specific details are described in detail. Those having ordinary skill in the art can fully understand the present disclosure without the description of these details. In addition, those having ordinary skill in the art should understand that the accompanying drawings provided herein are for illustrative purposes.

Similar words such as "including", "include", "comprising" and "comprise" in the present disclosure should be interpreted as inclusive rather than exclusive or exhaustive meaning, unless clearly required otherwise in the context. In other words, it means "including but not limited to".

In the description of the present disclosure, it should be understood that terms "first", "second" and the like are only used for descriptive purposes without representing a sequence, and cannot be understood as indicating or implying relative importance. In addition, in the description of the present disclosure, expression "a plurality of" means two or more, unless otherwise specified.

In the related art, the NOC is used to communicate between cores by a many-core chip. Taking the method of sending a data packet from the master data sending unit to the slave data receiving unit in the background as an example, there are many shortcomings as follows: 1) in a case of unicast, the address of the destination core needs to be added to the packet header, and a payload is increased; 2) in a case of multicast, it is necessary to add addresses of a plurality of destination cores in the packet header, and the payload is greater; 3) when a plurality of data packets share one header, the data packets sharing the same header need to be cached at an intermediate network node together, so an occupied buffer of the intermediate network node is large, and the transmission of the plurality of data packets sharing the same header cannot be interrupted, which affects transmission efficiency of other cores using the intermediate network node; 4) during data transmission, all cores need to be addressed uniformly, a complete routing table needs to be stored in each core, and thus the overhead is huge.

In order to solve the problems of the related art, the present disclosure provides a data transmission method for a network on chip, as shown in FIG. 1, including steps S100 to S103.

At step S100, a first data packet sent by a first network node is received by a second network node, the first data packet includes first identification information and a data packet payload.

Specifically, the first network node may be a master data sending unit or an intermediate network node, and the second network node may be an intermediate network node or a slave data receiving unit.

For example, the first identification (ID) information is 0, and a label of the first ID information is IDD, that is, ID0=0; or the first ID information is 1, and the label of the first ID information is ID1, that is, ID1=1; or the first ID information is 0, and the label of the first ID information is ID2, that is, ID2=0, which is specifically determined according to an actual situation. The foregoing is only an exemplary expression.

At step S101, valid transmission information and second identification information corresponding to the valid transmission information is determined by the second network node according to the first identification information.

Specifically, the second network node may inquire in a preset path routing table according to the first identification information, to determine the valid transmission information and the second identification information corresponding to the valid transmission information. The path routing table may be set according to the first identification information, and include the first identification information, the valid transmission information and the second identification information. Specifically, the path routing table may be set according to a quantity of the first identification information. The valid transmission information refers to whether a data packet is sent at a certain outlet, a quantity of the valid transmission information may be one or more, and the second identification information may have a one-to-one correspondence with the valid transmission information in.

For example, it is assumed that the path routing table preset in the second network node is shown in Table 1 as below:

TABLE 1

| first ID information | whether forwarded by outlet 1 | new ID information of outlet 1 | whether forwarded by outlet 2 | new ID information of outlet 2 | ... |
|---|---|---|---|---|---|
| 0 | sending/ not sending | 0/1/ ... | sending/ not sending | 0/1/ ... | ... |
| 1 | sending/ not sending | 0/1/ ... | sending/ not sending | 0/1/ ... | ... |
| ... | ... | ... | ... | ... | ... |

Where, the value of the first ID information may be multiple, which is determined according to hardware situation. Similarly, the new ID information of the outlet 1 and the new ID information of the outlet 2 are also determined according to the hardware situation. The number of outlets corresponding to the first ID information is determined according to the actual situation, which is not limited in the present disclosure. For example, when the first ID information is equal to 0, it is determined that the data packet payload is sent by the outlet 1, the new ID information of outlet 1 is 0, and the label of the new ID information of the outlet 1 may be called as ID1 in order, that is, ID1=0.

At step S102, a second data packet is determined by the second network node according to the second identification information and the data packet payload.

Specifically, the second network node may replace the first identification information in the first data packet with the second identification information, to obtain the second data packet.

At step S103, the second data packet is sent according to a transmission direction of the data packet payload.

It is assumed that the master data sending unit is M0, and M0 sends a data packet to a slave data receiving unit S1 through intermediate network nodes n1 and n2, as shown in FIG. 2. The first data packet sent by M0 carries ID information 0, the label of the ID information is ID0, that is, ID0=0. After receiving the data packet, n1 inquires in its path routing table according to ID0=0, to determine an outlet through which the data packet payload is sent and new ID information 0, the label of the ID information is ID1, that is ID1=0. n1 adds the new ID information 0 to the data packet payload, to determine a new second data packet, and sends the second data packet to n2. After receiving the second data packet, n2 determines an outlet through which the data packet payload is sent and new ID information 0 according to ID1=0, the label of the ID information is ID2, that is, ID2=0. n2 adds the new ID information 0 to the data packet payload, to determine a new third data packet, and sends the new third data packet to S1. A transmission path of the data packet is from M0 to n1 to n2 to S1. Since the transmission path may be preset, the path routing table in the intermediate node may also be preset.

In embodiments of the present disclosure, first, the second network node receives the first data packet sent by the first network node, the first data packet includes the first identification information and the data packet payload, the second network node then determines the valid transmission information and the second identification information corresponding to the valid transmission information according to the first identification information, and determines the second data packet according to the second identification information and the data packet payload, and finally the second network node sends the second data packet according to the valid transmission information. In the embodiments of the present disclosure, whether it is unicast or multicast, the data packet only needs to contain the first identification information, and does not need to contain the address of the destination core, reducing the payload. Upon determining the valid transmission information, the required path routing table is set according to the quantity of the first identification information, and the complete routing table does not need to be stored in the network node, reducing the overhead.

Optionally, the second network node in step S100 is a slave data receiving unit, and after step S100, the method may further include: determining, by the second network node, a storage address of the first data packet according to the first identification information, in response to that there is no valid transmission information; and storing, by the second network node, the first data packet to the storage address.

Specifically, according to the first identification information, a storage address generation mode is obtained according to a set mode, the storage address is calculated, and the first data packet is stored in the storage address, where the set mode is looking up a table lookup or increment to a previous storage address.

Optionally, the path routing table may be stored in a register of the second network node, or stored in a random access memory.

In the following, a specific embodiment is used to describe in detail a data transmission method for a network on chip provided in the present disclosure. The application scenario is shown in FIG. 3, assuming that there are two master data sending units, namely M0 and M1, M0 sends a data packet to slave data receiving units S1 and S2, M1 sends a data packet to a slave data receiving unit S3, and there are four intermediate network nodes n1, n2, n3 and n4. Specifically, M0 sends the data packet to S1 through ID0, ID1, and ID2 by passing through the intermediate network nodes n1 and n2, and sends the data packet to S2 through ID0, ID1, ID3, and ID4 by passing through the intermediate network nodes n1, n2, and n4. The path from M0 to S1 and S2 may be called as Path 0. M1 sends a data packet to S3 through D0', ID2' and ID3' by passing through the intermediate network nodes n2, n4 and n3. The path from M1 to S3 may be called as Path 1.

Figure 4:
FIG. 4 is a flowchart of another data transmission method for a network on chip according to an embodiment of the present disclosure.

The specific processing flow of Path 0 is shown in FIG. 4.

At step S400, a data packet a is sent to n1 by M0, the data packet a includes ID information 0 and a data packet payload.

Specifically, a label of the ID information is ID0, that is, ID0=0. In order to clearly indicate the ID information included in the data packet in the following steps, the label of the ID information is also indicated below. However, in the actual transmission process, the data packet may not include the label of the ID information, or may include the label of the ID information.

At step S401, the data packet a is received by n1, inquire in a path routing table 1 stored in n1 according to ID0=0, and it is determined that a data packet should be sent from a right outlet, and new ID information ID1 of the data packet is equal to 0.

Specifically, the path routing table 1 is as follows:

Path Routing Table 1

| original ID info | whether is sent by left outlet | left new ID info | whether is sent by right outlet | right new ID info | whether is sent by upper outlet | upper new ID info | whether is sent by lower outlet | lower new ID info |
|---|---|---|---|---|---|---|---|---|
| 0 | not | 0 | sending | 0 | not | 0 | not | 0 |

It can be seen from the above table that the outlets of n1 have four directions. According to looking up the table, it is determined that the data packet payload is sent to n2 from the right outlet of n1, and the new ID information is determined to be ID1=0.

At step S402, the original ID information 0 in the data packet a is replaced with the new ID information ID1=0, to obtain a new data packet b.

At step S403, the data packet b is sent to n2 by n1.

At step S404, the data packet b is received by n2, inquire in a path routing table 2 stored in n2 according to ID1=0, and it is determined that a data packet should be sent from a right outlet and new ID information ID2 of the data packet is equal to 0, and that a data packet should be sent from a lower outlet and new ID information ID3 of the data packet is equal to 1.

Specifically, the path routing table 2 is as follows:

Path Routing Table 2

| original ID info | whether is sent by left outlet | left new ID info | whether is sent by right outlet | right new ID info | whether is sent by upper outlet | upper new ID info | whether is sent by lower outlet | lower new ID info |
|---|---|---|---|---|---|---|---|---|
| 0 | not | 0 | sending | 0 | not | 0 | sending | 1 |
| 1 | not | 0 | not | 0 | not | 0 | sending | 0 |

It can be seen from the above table that the outlets of n2 have four directions. According to looking up the table, it is determined that the data packet payload is sent to S1 from the right outlet of n2, and the new ID information is determined to be ID2=0; the data packet payload is sent to n4 from the lower outlet of n2, and the new ID information is determined to be ID3=1.

At step S405, the original ID information ID1=0 in the data packet b is replaced with the new ID information ID2=0, to obtain a new data packet c, and the original ID information ID1=0 in the data packet b is replaced with the new ID information ID3=1, to obtain a new data packet d.

At step S406, the data packet c is sent to S1 by n2, and the data packet d is sent to n4 by n2.

At step S407, the data packet d is received by n4, inquire in a path routing table 3 stored in n4 according to ID3=1, and it is determined that a data packet should be sent from a lower outlet, and new ID information ID4 of the data packet is equal to 0.

Specifically, the path routing table 3 is as follows:

Path Routing Table 3

| original ID info | whether is sent by left outlet | left new ID info | whether is sent by right outlet | right new ID info | whether is sent by upper outlet | upper new ID info | whether is sent by lower outlet | lower new ID info |
|---|---|---|---|---|---|---|---|---|
| 0 | sending | 0 | not | 0 | not | 0 | not | 1 |
| 1 | not | 0 | not | 0 | not | 0 | sending | 0 |

It can be seen from the above table that the outlets of n4 have four directions. According to looking up the table, it is determined that the data packet payload is sent to S2 from the lower outlet of n4, and the new ID information is determined to be ID4=0.

At step S408, the original ID information ID3=1 in the data packet d is replaced with the new ID information ID4=0, to obtain a new data packet e.

At step S409, the data packet e is sent to S2 by n4.

At step S410, after the data packet c is sent to S1 and the data packet e is sent to S2 in step S406 and step S409, S1 obtains a storage address generation mode according to ID2=0, calculates a storage address, and stores the data packet to the storage address; S2 obtains a storage address generation mode according to ID4=0, calculates a storage address, and stores the data packet to the storage address.

Figure 5:
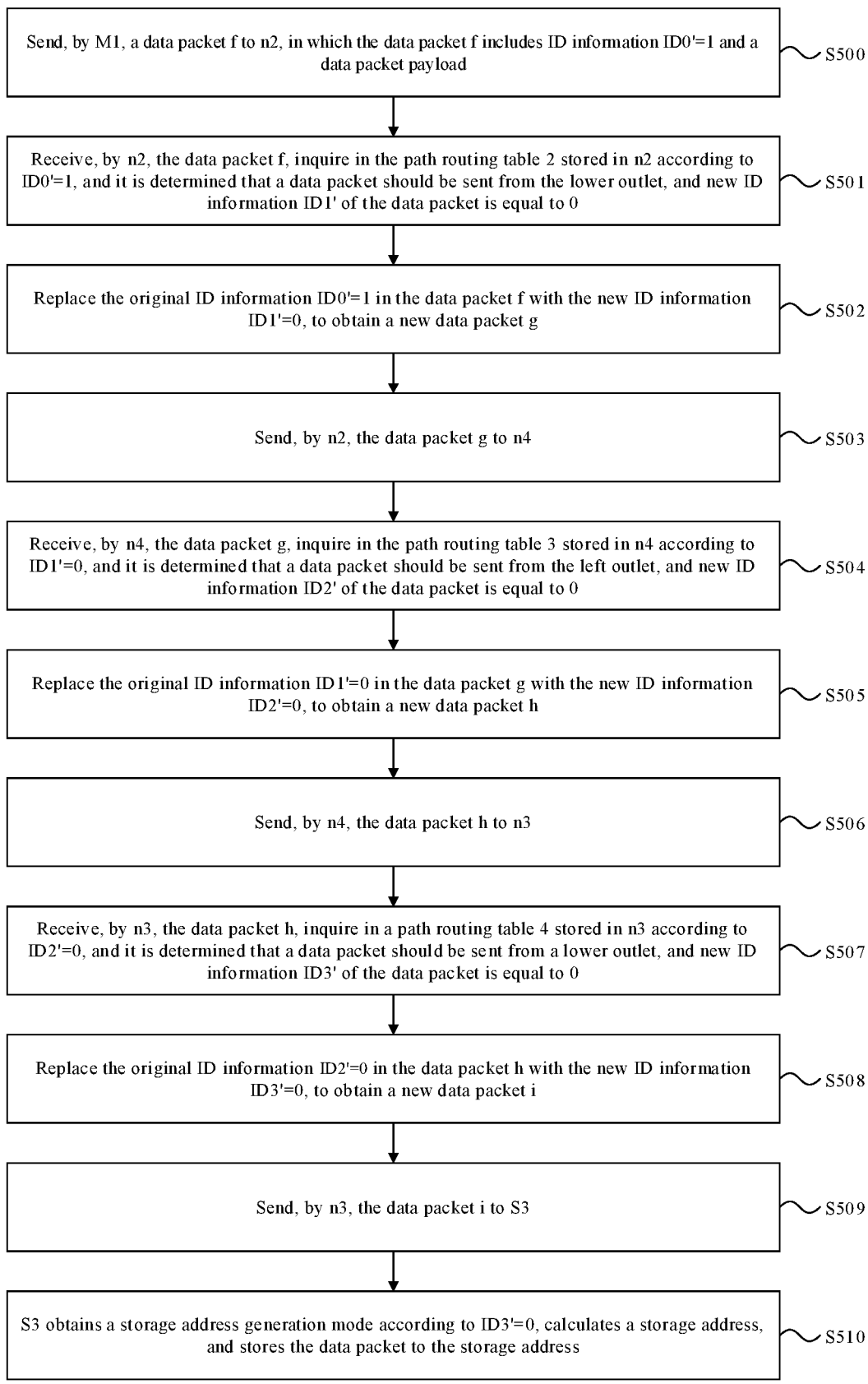
FIG. 5 is a schematic diagram of yet another data transmission method for a network on chip according to an embodiment of the present disclosure.

The specific processing flow of Path 1 is shown in FIG. 5.

At step S500, a data packet f is sent to n2 by M1, the data packet f includes ID information ID0'=1 and a data packet payload.

At step S501, the data packet f is received by n2, inquire in the path routing table 2 stored in n2 according to ID0'=1, and it is determined that a data packet should be sent from the lower outlet, and new ID information ID1' of the data packet is equal to 0.

At step S502, the original ID information ID0'=1 in the data packet f is replaced with the new ID information ID1'=0, to obtain a new data packet g.

At step S503, the data packet g is sent to n4 by n2.

At step S504, the data packet g is received by n4, inquire in the path routing table 3 stored in n4 according to ID1'=0, and it is determined that a data packet should be sent from the left outlet, and new ID information ID2' of the data packet is equal to 0.

At step S505, the original ID information ID1'=0 in the data packet g is replaced with the new ID information ID2'=0, to obtain a new data packet h.

At step S506, the data packet h is sent to n3 by n4.

At step S507, the data packet h is received by n3, inquire in a path routing table 4 stored in n3 according to ID2'=0, and it is determined that a data packet should be sent from a lower outlet, and new ID information ID3' of the data packet is equal to 0.

Specifically, the path routing table 4 is as follows:

| | | | | | | | | |
|---|---|---|---|---|---|---|---|---|
| Path Routing Table 4 | | | | | | | | |
| original ID info | whether is sent by left outlet | left new ID info | whether is sent by right outlet | right new ID info | whether is sent by upper outlet | upper new ID info | whether is sent by lower outlet | lower new ID info |
| 0 | not | 0 | not | 0 | not | 0 | sending | 0 |

It can be seen from the above table that the outlets of n3 have four directions. According to looking up the table, it is determined that the data packet payload is sent to S3 from the lower outlet of n3, and the new ID information ID3' is equal to 0.

At step S508, the original ID information ID2'=0 in the data packet h is replaced with the new ID information ID3'=0, to obtain a new data packet i.

AT step S509, the data packet i is sent to S3 by n3.

At step S510: S3 obtains a storage address generation mode according to ID3'=0, calculates a storage address, and stores the data packet to the storage address.

There is no chronological sequence between the above two processing processes.

Figure 6:
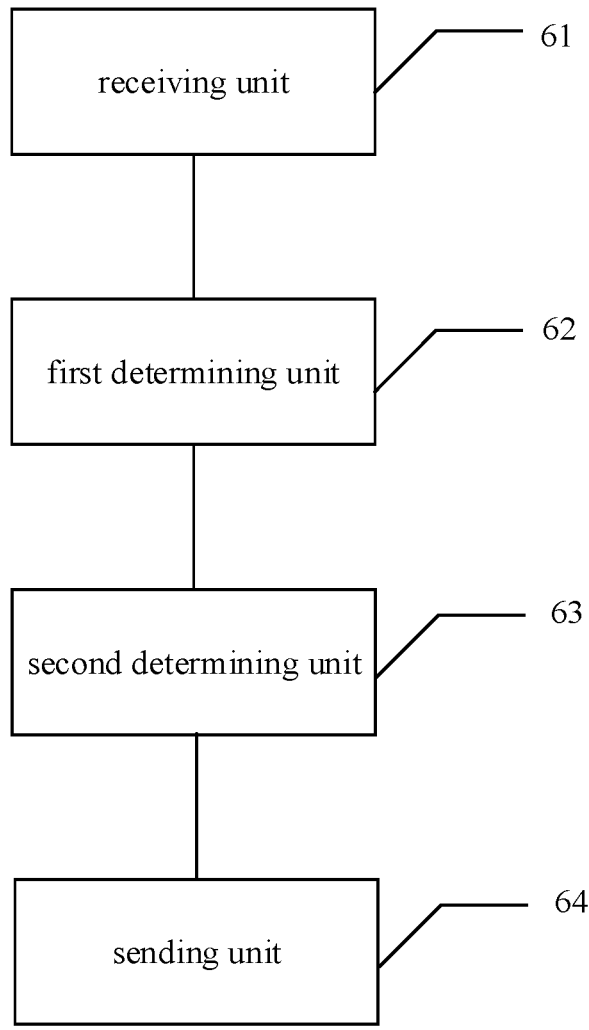
FIG. 6 is a schematic diagram of a data transmission device for a network on chip according to an embodiment of the present disclosure.

FIG. 6 is a schematic diagram of a data transmission device for a network on chip according to an embodiment of the present disclosure.

As shown in FIG. 6, the data transmission device for the network on chip includes: a receiving unit 61, a first determining unit 62, a second determining unit 63, and a sending unit 64. The receiving unit 61 is configured to receive a first data packet sent by a first network node, the first data packet including first identification information and a data packet payload. The first determining unit 62 is configured to determine valid transmission information and second identification information corresponding to the valid transmission information according to the first identification information. The second determining unit 63 is configured to determine a second data packet according to the second identification information and the data packet payload. The sending unit 64 is configured to send the second data packet according to the valid transmission information.

In an embodiment, a quantity of the valid transmission information is one or more, and the second identification information has a one-to-one correspondence with the valid transmission information.

In an embodiment, the first determining unit is configured to inquire in a preset path routing table according to the first identification information, to determine the valid transmission information and the second identification information corresponding to the valid transmission information. The path routing table is set according to the first identification information, and includes the first identification information, the valid transmission information and the second identification information.

In an embodiment, the second determining unit is configured to replace the first identification information in the first data packet with the second identification information, to obtain the second data packet.

In an embodiment, the device may further include a storage unit configured to: determine a storage address of the first data packet according to the first identification information, in response to that there is no valid transmission information; and store the first data packet to the storage address.

In an embodiment, the path routing table is stored in a register of a second network node to which the receiving unit belongs, or stored in a random access memory.

Figure 7:
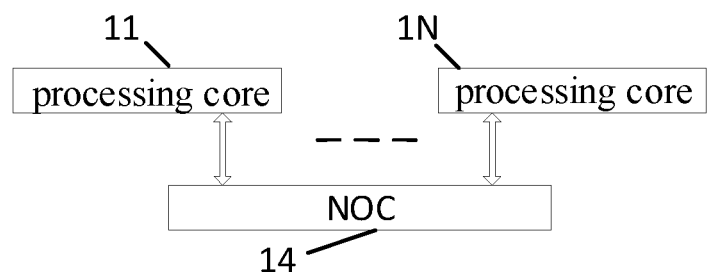
FIG. 7 is a schematic structural diagram of an electronic apparatus according to an embodiment of the present disclosure.

FIG. 7 is a schematic structural diagram of an electronic apparatus according to an embodiment of the present disclosure.

As shown in FIG. 7, the electronic apparatus includes processing cores 11-1N and a Network on Chip (NOC) 14. The processing cores 11-1N are all connected to the NOC 14. The NOC 14 is configured to exchange data between the N processing cores and external data. The N processing cores store instructions, and the electronic apparatus performs the following operations according to the instructions: receiving, by a second network node, a first data packet sent by a first network node, the first data packet including first identification information and data packet payload; determining, by the second network node, valid transmission information and second identification information corresponding to the valid transmission information according to the first identification information; determining, by the second network node, a second data packet according to the second identification information and the data packet payload; and sending, by the second network node, the second data packet according to the valid transmission information.

As those having ordinary skill in the art should anticipate, various aspects of the embodiments of the present disclosure may be implemented as a system, a method, or a computer program product. Therefore, various aspects of the embodiments of the present disclosure may be in the following forms: a complete hardware implementation, a complete software implementation (including firmware, resident software, microcode, etc.), or an implementation that combines software and hardware and may be generally referred to as "a circuits", "a module" or "a system" herein. In addition, various aspects of the embodiments of the present disclosure may be in the following forms: a computer program product implemented in one or more computer-readable media, the computer-readable medium includes computer-readable program codes implemented thereon.

Any combination of one or more computer readable media may be utilized. The computer-readable medium may be a computer-readable signal medium or a computer-readable storage medium. The computer-readable storage medium may be, for example, but not limited to, an electronic, magnetic, optical, electromagnetic, infrared, or semiconductor system, apparatus or device, or any appropriate combination thereof. More specific examples (non-exhaustive list) of the computer-readable storage media would include the following: an electrical connection with one or more wires, a portable computer floppy disk, hard disk, random access memory (RAM), read-only memory (ROM), erasable programmable read only memory (EPROM or flash memory), optical fiber, portable compact disk read only memory (CD-ROM), optical storage device, magnetic storage device, or any appropriate combination thereof. In the context of the embodiments of the present disclosure, the computer-readable storage medium may be any tangible medium that can contain or store a program used by an instruction execution system, apparatus or device, or a program used in conjunction with the instruction execution system, apparatus or device.

The computer-readable signal medium may include a propagated data signal having computer-readable program code implemented therein as in baseband or as a part of a carrier wave. Such propagated signal may be in any of a variety of forms, including but not limited to: electromagnetic, optical, or any suitable combination thereof. The computer-readable signal medium may be any of the following computer-readable media: which is not a computer-readable storage medium, and may communicate and propagate program used by the instruction execution system, apparatus or device, or used in conjunction with the instruction execution system, apparatus or device.

Any suitable medium including, but not limited to, wireless, wired, fiber optic cable, RF, etc. or any appropriate combination thereof may be used to transmit the program code implemented on the computer-readable medium.

The computer program code used to perform operations directed to various aspects of the embodiments of the present disclosure can be written in any combination of one or more programming languages, the programming languages including: object-oriented programming languages such as Java, Smalltalk, C++, etc.; and conventional process programming languages such as "C" programming language or similar programming languages. The program code can be executed as an independent software packet entirely on user's computer, partly on user's computer; partly on user's computer and partly on a remote computer; or entirely on the remote computer or server. In the latter case, the remote computer can be connected to the user's computer through any type of network including a local area network (LAN) or a wide area network (WAN), or can be connected with an external computer (for example, by using Internet of an Internet service provider).

The foregoing flowchart illustrations and/or block diagrams of the methods, apparatuses (systems) and computer program products according to the embodiments of the present disclosure describe various aspects of the embodiments of the present disclosure. It should be understood that each block of the flowchart illustrations and/or block diagrams and combinations of blocks in the flowchart illustrations and/or block diagrams can be implemented by computer program instructions. These computer program instructions can be provided to a processor of a general-purpose computer, a special-purpose computer, or other programmable data processing apparatus to generate a machine, so that the instructions (executed by the processor of the computer or other programmable data processing apparatus) create a device for implementing functions/actions specified in the flowcharts and/or block diagrams or blocks.

These computer program instructions may also be stored in a computer-readable medium that can direct a computer, other programmable data processing apparatus, or other apparatuses to operate in a specific manner, so that the instructions stored in the computer-readable medium generate articles for implementing the functions/actions specified in the flowcharts and/or block diagrams or blocks.

The computer program instructions may also be loaded on a computer, other programmable data processing apparatus or other apparatuses, so that a series of operable steps are executed on the computer, other programmable apparatus or other apparatuses to generate a computer-implemented process, so that instructions executed on a computer or other programmable apparatus to provide a process for implementing functions/actions specified in the flowchart and/or block diagrams or blocks.

The foregoing descriptions are only preferred embodiments of the present disclosure and are not used to limit the present disclosure. For those having skill in the art, the present disclosure may have various modifications and changes. Any modification, equivalent replacement, improvement, etc. made within the spirit and principle of the present disclosure should be included in the protection scope of the present disclosure.

What is claimed is:

1. A data transmission method for a network on chip, comprising:
   receiving, by a second network node, a first data packet sent by a first network node, wherein the first data packet comprises first identification information and a data packet payload;
   determining, by the second network node, valid transmission information and second identification information corresponding to the valid transmission information according to the first identification information;
   determining, by the second network node, a second data packet according to the second identification information and the data packet payload; and
   sending, by the second network node, the second data packet according to the valid transmission information,
   wherein the step of determining, by the second network node, the valid transmission information and the second identification information corresponding to the valid transmission information according to the first identification information comprises:
   inquiring, by the second network node, in a preset path routing table according to the first identification information, to determine the valid transmission information and the second identification information corresponding to the valid transmission information, wherein the path routing table is set according to the first identification information and comprises the first identification information, the valid transmission information and the second identification information,
   wherein the valid transmission information refers to information about whether a data packet is sent at a certain outlet, and
   wherein the path routing table only stores the valid transmission information corresponding to the first identification information and the second identification information corresponding to the valid transmission information.

2. The method of claim 1, wherein a quantity of the valid transmission information is one or more, and the second identification information has a one-to-one correspondence with the valid transmission information.

3. The method of claim 1, wherein the step of determining, by the second network node, the second data packet according to the second identification information and the data packet payload comprises:

replacing, by the second network node, the first identification information in the first data packet with the second identification information, to obtain the second data packet.

4. The method of claim 1, wherein after the step of receiving, by the second network node, the first data packet sent by the first network node, the method further comprises:
determining, by the second network node, a storage address of the first data packet according to the first identification information, in response to that there is no valid transmission information; and
storing, by the second network node, the first data packet to the storage address.

5. The method of claim 1, wherein the path routing table is stored in a register of the second network node, or stored in a random access memory.

6. A data transmission device for a network on chip, comprising:
a receiving unit configured to receive a first data packet sent by a first network node, wherein the first data packet comprises first identification information and a data packet payload;
a first determining unit configured to determine valid transmission information and second identification information corresponding to the valid transmission information according to the first identification information;
a second determining unit configured to determine a second data packet according to the second identification information and the data packet payload; and
a sending unit configured to send the second data packet according to the valid transmission information,
wherein the first determining unit is further configured to:
inquire in a preset path routing table according to the first identification information, to determine the valid transmission information and the second identification information corresponding to the valid transmission information, wherein the path routing table is set according to the first identification information and comprises the first identification information, the valid transmission information, and the second identification information,
wherein the valid transmission information refers to information about whether a data packet is sent at a certain outlet, and
wherein the path routing table only stores the valid transmission information corresponding to the first identification information and the second identification information corresponding to the valid transmission information.

7. The device of claim 6, wherein a quantity of the valid transmission information is one or more, and the second identification information has a one-to-one correspondence with the valid transmission information.

8. The device of claim 6, wherein the second determining unit is further configured to:
replace the first identification information in the first data packet with the second identification information, to obtain the second data packet.

9. The device of claim 6, wherein the device further comprises a storage unit configured to:
determine a storage address of the first data packet according to the first identification information, in response to that there is no valid transmission information; and
store the first data packet to the storage address.

10. The device of claim 6, wherein the path routing table is stored in a register of a second network node to which the receiving unit belongs, or stored in a random access memory.

11. An electronic apparatus, wherein the electronic apparatus comprises:
a plurality of processing cores; and
a network on chip configured to exchange data between the plurality of processing cores and external data;
wherein the plurality of processing cores store instructions, and the electronic apparatus performs the method of claim 1 according to the instructions.

12. A non-transitory computer-readable storage medium storing a computer program instruction thereon, wherein the computer program instruction, when executed by a processor, causes the processor to implement the method of claim 1.

* * * * *